June 9, 1964  KARL EICKMANN  3,136,260
CONTROL SHAFT MOUNTING FOR FLUID HANDLING DEVICE
Filed March 7, 1961  3 Sheets-Sheet 1
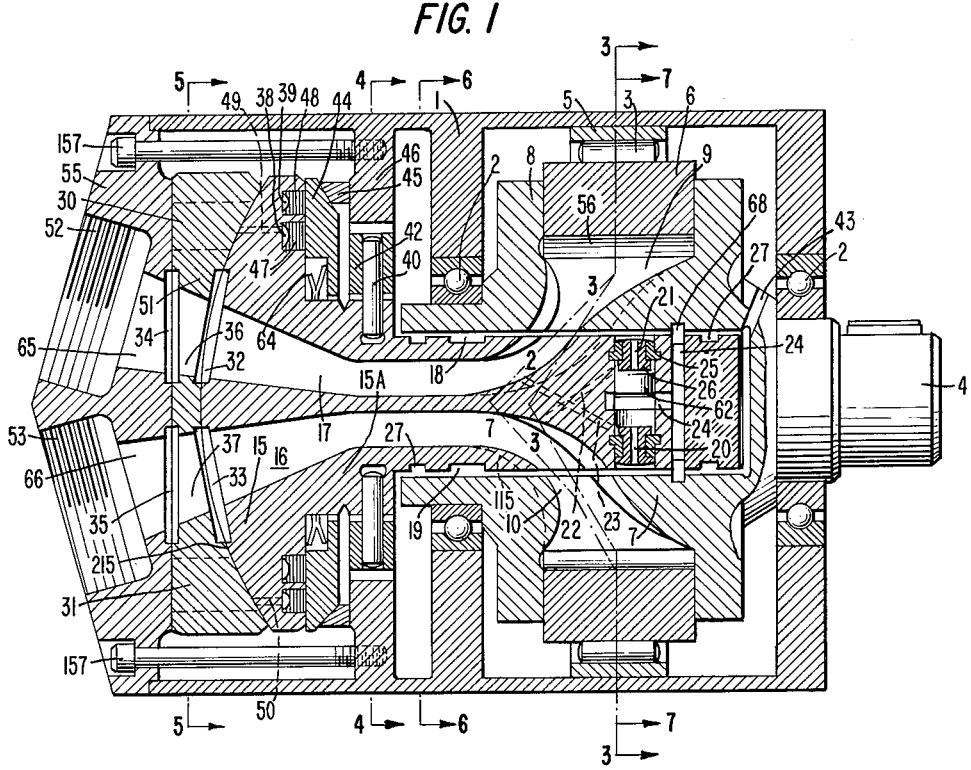
FIG. 1
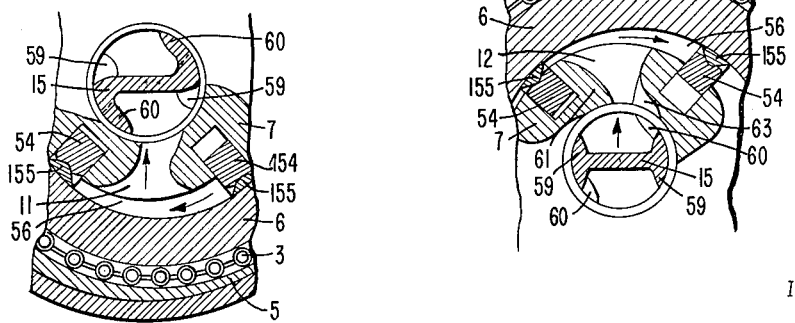
FIG. 3
FIG. 2
INVENTOR
KARL EICKMANN
BY McGlew and Toren
ATTORNEYS June 9, 1964 KARL EICKMANN 3,136,260
CONTROL SHAFT MOUNTING FOR FLUID HANDLING DEVICE
Filed March 7, 1961 3 Sheets-Sheet 2
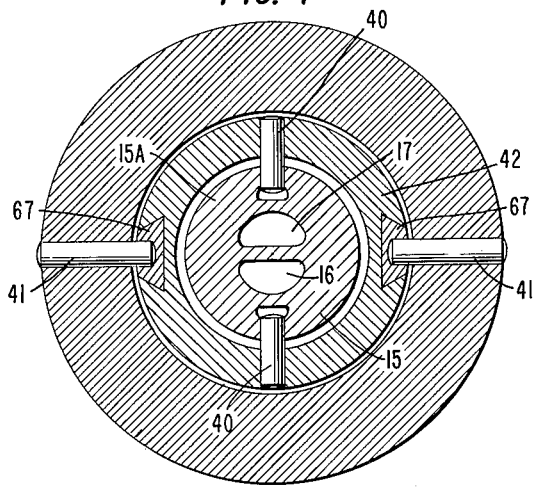
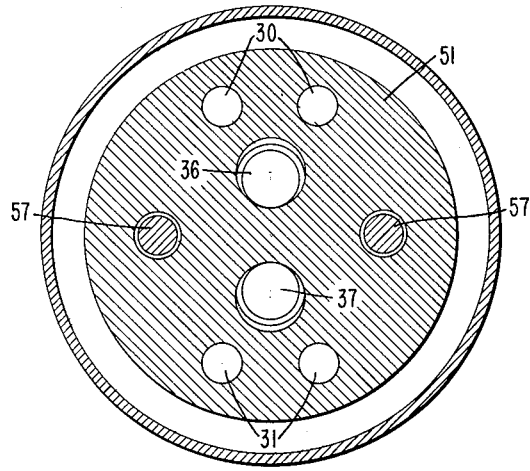
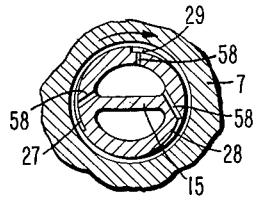
INVENTOR
KARL EICKMANN
BY McGlew and Toren
ATTORNEYS June 9, 1964  KARL EICKMANN  3,136,260
CONTROL SHAFT MOUNTING FOR FLUID HANDLING DEVICE
Filed March 7, 1961  3 Sheets-Sheet 3

INVENTOR
KARL EICKMANN
BY McGlew and Toren
ATTORNEYS

United States Patent Office 3,136,260
Patented June 9, 1964

3,136,260
CONTROL SHAFT MOUNTING FOR FLUID
HANDLING DEVICE
Karl Eickmann, 2420 Ishiki, Hayama-machi,
Miuragun, Kanagawa-ken, Japan
Filed Mar. 7, 1961, Ser. No. 96,342
Claims priority, application Germany Mar. 7, 1960
16 Claims. (Cl. 103—121)

This invention relates to rotary apparatus using high pressure fluid as a working medium and of the type in which the fluid is circulated to and from a rotor substantially axially thereof through a relatively stationary control shaft substantially coaxial with the rotor. More particularly, the invention is directed to a novel and improved control shaft and mounting therefor by means of which the overall efficiency of such apparatus is greatly increased.

Rotary apparatus of the type to which the invention is applicable includes rotary vane pumps and motors, turbines, hydraulic couplings, and like machines, and the high pressure working mediums may include steam, hydraulic fluids, gases, and the like.

One of the problems in such apparatus involves mounting of the relatively stationary control shaft so that it can readily accommodate itself or adjust to radial and axial play of the rotor. A solution to this problem has been proposed in German patent application E-16937Ia/59e, corresponding to U.S. Patent Application Ser. No. 783,455, filed December 29, 1958, now Patent No. 3,062,151.

However, even with solution of this problem, there are still many losses in such apparatus which, if they could be eliminated or at least decreased, would greatly increase the efficiency of such apparatus. Among such losses are friction between the control shaft and the rotor, and flow losses in the control shaft and between the control shaft and the rotor. Other losses are due to excessive weight of the parts as compared to the output, failure to properly pressure balance the control shaft, excessive dimensions of parts, and failure to use advantageously certain forces present in the operation.

In accordance with the present invention, the efficiency of such rotary apparatus is sharply increased by using a cylindrical control shaft telescoped coaxially into the rotor and circulating the working medium to and from the rotor through passages extending axially or substantially axially of the control shaft and substantially streamline in axial section so as to avoid any abrupt changes in the velocity or direction of fluid flow.

By streamlining the fluid circulating passages, losses due to sudden enlargements or constrictions in the flow passages are eliminated, and streamlining of the inlet and outlet ports for the fluid medium is made possible and practical.

The control shaft is mounted intermediate its ends in the casing of the machine, and the mounting is designed to permit universal angular adjustment of the control shaft as well as limited axial movement thereof. Thus, the control shaft can readily adjust to angular or axial play of the machine rotor. In addition, the outer end of the control shaft is formed as an enlarged head having an outwardly convex spherical outer surface engaging a mating spherically concave inner surface of a thrust bearing having a plane outer surface engaging a plane inner surface on a head on end closure of the casing. This arrangement facilitates the self adjustment of the control shaft to variations in the orientation or position of the machine rotor.

Of course such relative adjusting movement involves movements of surfaces over each other with resultant potential friction losses. In accordance with the invention, such losses are eliminated by providing ports and passages through the control shaft for the flow of fluid under pressure to provide pressure fluid balancing of the control shaft and its thrust bearing, the pressures on opposite faces of these elements being thereby equalized to provide a floating support for the control shaft. Peripheral grooves are formed in the control shaft outer surface to receive fluid under pressure to floatingly support the control shaft within the rotor. Pressure equalizing cross connection passage means in the control shaft further assure centering of the control shaft in the rotor despite the inequality of rotor inlet and outlet pressures.

Due to the cylindrical form of the control shaft, as compared to known plane and spherical control surfaces, the diameter of the control shaft may be reduced substantially, thus further reducing frictional losses. The streamlining of the fluid circulating passages reduces acceleration and turbulence losses and permits higher operating velocities. This enables effective use to be made of centrifugal force to increase the fluid velocity by reducing the pressure at the rotor inlet ports. As an auxiliary feature, the substantially reduced outer diameter of the control shaft provides a substantial decrease in the ratio of the weight of the parts per unit output.

For an understanding of the invention principles, reference is made to the following description of typical embodiments thereof as illustrated in the accompanying drawings. In the drawings:

FIG. 1 is an axial sectional view through a hydraulic pump or hydraulic motor embodying the invention;

FIGS. 2 through 7 are diametric or radial sectional views taken on the correspondingly numbered lines of FIG. 1.

Figure 7:
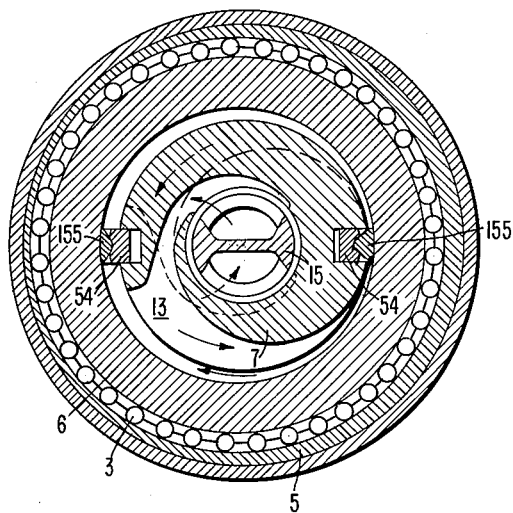

Referring to the drawings, the illustrated pump or motor includes a substantially cylindrical housing or casing 1 in which are mounted anti-friction bearing assemblies 2 and 3. Bearing assemblies 2 rotatably mount a rotor 7 preferably integral with a driving or output shaft 4 arranged for keyed coupling to a driving or driven mechanism. Bearing assembly 3 is mounted between an eccentric ring 5 and a vane ring 6 held between walls 8 of rotor 7. Rotor 7 is formed with fluid flow passages 9, 10, 11, 12, 13 (FIG. 7), and 14 (FIG. 8) whose function is described hereinafter.

Rotor 7 is formed with a cylindrical axial passage which receives, with running clearance, a cylindrical axial arbor 115 of the non-rotatable control shaft 15 which has an enlarged head 215 at its outer end formed with an outwardly spherically convex outer surface. Shaft 15 is formed with substantially axially extending fluid inlet and outlet passages 16 and 17 which are streamlined in longitudinal section. Control shaft 15 may be cast and machined as a single piece. It will be noted that the inner end of the hub of rotor 7 projects through the inner bearing assembly 2 and has an end surface forming a shoulder opposed to a radial shoulder forming surface on an intermediate cylindrical enlargement 15A of control shaft 15.

Referring to FIGS. 1 and 4, enlargement 15A receives diametrically aligned pins 40 seated in a Cardan ring 42. The Cardan ring 42 comprises part of a Cardan suspension, and peripherally embraces the control shaft with radial clearance with the latter. This ring is designed to permit oscillation of the control shaft about mutually perpendicular axes extending diametrically of the control shaft. Ring 42 is axially slidable in an annular internal flange 46 of casing 1, by virtue of pins 41 engaged in flange 46 and seated in shoes 67 slidable in dovetail peripheral grooves of ring 42. Pins 41 are spaced 90° circumferentially from pins 40. Cardan ring 42 provides a universal and axially slidable mounting for control shaft 15, with axial movement of shaft 15 into rotor 7 being limited by the aforementioned opposed shoulders.

Outward movement of control shaft 15 is limited by engagement of the spherically convex surface of head 215 with the spherically concave inner surface of a thrust bearing 51. Bearing 51 has a plane diametric outer surface having sliding engagement with a plane diametric inner surface on a removable head 55 secured to casing 1 by bolts 157. Thrust bearing 51 has ports or passages 36, 37 forming streamline continuations of passages 16, 17, and head 55 has ports or passages 65 and 66 forming streamline continuations of passages 36, 37. Passages 65 and 66 communicate with threaded inlet-outlet recesses 52, 53 in the outer surface of head 55.

The described arrangement provides for limited axial and universal angular displacement of control shaft 15, whereby the control shaft may follow angular and axial deviations and oscillations of rotor 7. The head 215 may slide relative to thrust bearing 51, and the latter may slide over head 55. Bolts 57, as best seen in FIG. 5, allow only limited lateral movement of thrust bearing 51, and shaft 15 is held against rotation by Cardan ring 42. This holding of control shaft 15 against rotation assures greater efficiency of the control. While Cardan ring 42 is shown as fixed in casing 1, it may be mounted in a ring which is angularly adjustable in casing 1. Thereby, control shaft 15 may be adjusted in leading and trailing directions relative to the ports or passages of rotor 7. Also, while head 215 is shown as having a convex surface engaging a concave surface of thrust bearing 51, the reverse arrangement may be used, with head 215 having a concave surface opposing a convex inner surface of bearing 51.

Control-shaft 15 is urged or biased toward thrust bearing 51 by springs 64 disposed between head 215 and a ring 44 positioned by a bearing ring 45 engaging flange 46. This arrangement assures maintenance of a fluid-tight seal between shaft 15 and bearing 51, while allowing angular adjustment of the control shaft. The springs 64 further accommodate any expansion of the parts due to heating.

At the location of the ports connecting the control shaft passages to the rotor passages, there is normally a pressure differential acting on the control shaft due to the difference between the inlet and exhaust pressures, and this pressure differential acts radially of the control shaft. This phenomenon is counteracted by the means shown at 18, 19, 20 and 21. The pressure fluid recesses 18 and 21 are located diametrically opposite the inner end or port of channel 16 and axially on either side thereof. The fluid pressure in these recesses thus balance the forces resulting from the fluid pressure at the port of channel 16. The pressure fluid chambers or recesses 19 and 20 are similarly located, and function in the same manner, with respect to the port of channel 17.

With machines operating at high pressures and high efficiencies, pressure balancing of the control shaft in the rotor, and the floating self-adjusting mounting of the rotor, are insufficient to secure a high output. This is due to the reaction forces resulting from high pressure fluid flow through the ports of the casing head 55 and the thrust bearing 51. These reaction forces tend to move control shaft 15 away from bearing 51. These forces act eccentrically due to the fact that the pressures in channels 16 and 17 are not usually equal.

This is counteracted by the pressure balancing means 30 and 31 in bearing 51. Balancing means 30 compensates for the reaction due to bore 37, and balancing means 31 compensates for that due to bore 36. The number of such balancing means is selected to achieve the desired pressure balancing. While these balancing means are shown as passages or bores through bearing 51, they may also be formed in the outer surface of head 215 or the inner plane surface of casing head 55.

The balancing pressures in the means 30 and 31 also act to move control shaft 15 away from bearing 51. To counteract this, chambers 38 and 39 are formed in the inner plane surface of control shaft head 215. These are preferably annular channels connected by bores 49 and 50, respectively, to the convex surface of head 215 to receive fluid under pressure. For practical reasons, the two annular channels are maintained at different pressure, as by having channel 38 at the pressure of passage 16 and channel 39 at the pressure of passage 17. The channels 38 and 39 are closed by rings 47 and 48 engaging ring 44. Desired interconnections are provided by channels or bores which are not illustrated but extend through the flange 15 to communicate, at one end, with one of the axial passages therein and, at the other end, with one of the channels. By proper dimensioning and pressure selection all eccentric pressure reaction forces may be balanced so that only axial forces act on bearing 51, thus maintaining effective sealing.

However, forces in addition to static forces due to the working fluid act on the control shafts of high pressure rotary machines, particularly those of the rotary vane or rotary piston type. While the control shaft itself introduces a weight factor, this is relatively small and can be neglected in high efficiency machines. However, at high angular velocities and high flow velocities in passages 16 and 17, dynamic damming forces, flow accelerating reaction forces, and impulse forces act on the control shaft. The sum of these forces can cause eccentricity between the control shaft and the rotor hub despite the static balancing means, resulting in increased friction and leakage losses. For example, the leakage losses at maximum eccentricity of the control shaft and the rotor hub may be 2.5 times those at concentricity, and this figure may be even higher due to friction heating.

Referring to FIGS. 1 and 6, means are provided to maintain concentricity of control shaft 15 and the hub of rotor 7 without mechanical contact of relatively movable parts. This means comprises circumferentially extending, angularly spaced slots 26, 28, 29 in axially spaced peripheral portions of shaft 15. These slots taper in depth from end to end, and receive high pressure fluid through bores 58. There are thus formed wedge shaped volumes of pressure medium between shaft 15 and the rotor hub. As the spacing of any particular portion of shaft 15 from the rotor hub tends to decrease, the pressure of these wedge shaped volumes of fluid is increased, thus resulting in automatic maintenance of concentricity. The wedge shaped slots may be provided in any desired number and, in high output machines, may be charged with working medium from the higher pressure passage 16 or 17, or with special lubricants. These several balancing arrangements allow a multiple increase in the relative velocity between stationary and moving parts.

The illustrated machine operates in a known manner. The working fluid may enter the rotor 7 through passage 16 and return through passage 18, or vice versa. If the inlet is channel or passage 17, the fluid enters rotor working chamber 56 through port 9 (FIG. 1) and returns through port 10. The rotor ports preferably extend at an angle to the rotor axis to gradually deflect the flow toward or from chamber 56. The centrifugal force due to rotation of rotor 7 acts on the working fluid in the rotor ports 9–14 to increase the fluid pressure acting radially outwardly and decrease that acting radially inwardly. The lowest pressure is adjacent the periphery of the control shaft. Not only does this increase the flow rate in channels 16 and 17 by a multiple but, if the machines are self-sucking, the suction velocity is greatly increased.

When the working fluid enters the rotor 7, it has imparted thereto an impulse in the direction of rotation exerting a braking force on the rotor. Furthermore, the impulse results in sharp contraction and turbulence in the rotor passages. The invention embraces means to reduce the sudden impulse and convert it into a gradual acceleration, whereby power is saved and contraction and acceleration losses are reduced. This is due to the rotor ports not extending radially of the control shaft but at an angle to the radius thereof.

Referring to FIG. 2, when an increment of the working medium enters rotor port 12, the leading wall of port 12 rotates away from such increment. Thus, at the instant of passage of the increment from shaft 15 to rotor 7, there is no acceleration of the increment in the direction of rotation. As the trailing edge of port 12 is streamlined, the increment of working medium is accelerated only gradually as it moves radially outwardly, until it reaches the velocity of rotation. For very high angular velocities, a port 13 as shown in FIG. 7 may be used.

Figure 8:
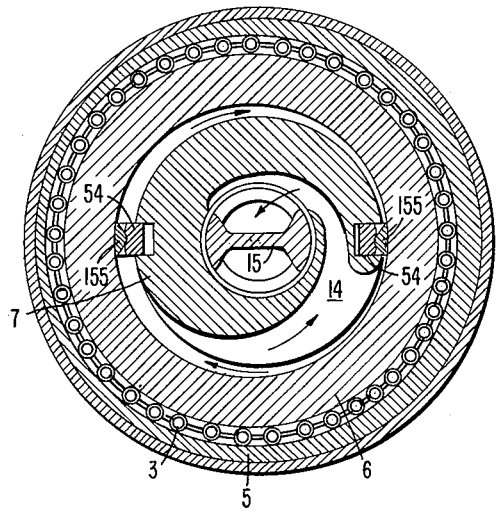
FIG. 8 is a view, similar to FIG. 7, illustrating an alternative embodiment of the invention.

For return flow, the port may take the shape of port 11 of FIG. 3 or, at very high angular velocities, the shape of the port 14 in FIG. 8. Thereby impulses on shaft 15 and contraction in the flow passages are avoided, reducing flow losses.

For best results, each rotor working chamber may be provided with a particular inlet port, such as 13 of FIG. 7, and with a particular outlet port, such as 14 of FIG. 8, and the inlet and outlet ports may be spaced apart axially with corresponding axial spacing of the inlet and outlet ports of the control shaft. As may be seen from FIGS. 7 and 8, the ports may have their leading and trailing edges spaced apart an amount of the order of 180 degrees. However, if there are several rotor working channels, these must be axially spaced from each other.

The same results can be obtained with the inlet and outlet ports combined in a single port as at 12 in FIG. 2 or 11 in FIG. 3, in which case the inlet and outlet sections of the port will be axially separated. In such case, the single port is formed with flow directing webs 61 and 63, and the corresponding port of shaft 15 is formed with a flow directing web 60. If the ports 9–14 do not have such special construction, the ports of shaft 15 are formed with only the usual control web 59.

Known forms of vanes are shown at 54 and 155. In such vane machines, it is often necessary to supply high pressure fluid beneath the vanes. This may be effected by the reversing bores 22, 23 in cooperation with passages 24, 68 and reversing piston 62. Piston 62 is movable in a control bore in shaft 15, provided with abutments limiting the piston stroke. Such abutments may comprise sectioned rings 25, the individual sections of which are placed in annular grooves in the control bore and held in position by bushings 26 pressed into the rings and flanged at an end. Bushings 26 may be ported for flow of pressure balancing fluid.

Additional pressure balancing chambers and recesses for thrust bearing 51 are indicated at 32, 33, 34, and 35.

While specific embodiments of the invention have been shown and described in detail to illustrate the application of the invention principles, it will be understood that the invention may be embodied otherwise without departing from such principles.

What is claimed is:

1. In a rotary machine using high pressure fluids as working mediums, and including a stator casing, a rotor having a hub and rotatably mounted in the casing, and a relatively non-rotatable control shaft substantially coaxial with the rotor and having one end extending coaxially into the hub of the rotor, the control shaft being formed with respective passages for admitting fluid to the rotor and returning fluid from the rotor: the improvement comprising means mounting said control shaft in the casing for limited universal angular movement and limited axial sliding movement, said means comprising a gimbal ring supporting said control shaft for oscillation about a first axis diametric thereof and means, including a sliding connection between said casing and said ring, mounting said ring in said casing for oscillation about a second axis perpendicular to said first axis, with said connection providing for movement of said ring axially of said rotor; a bearing flange on the other end of the control shaft having a spherical outer surface; a thrust bearing having a spherical inner surface substantially mating with said spherical outer surface, and a plane diametric outer surface; and an end wall for said casing having a plane diametric inner surface engaging said plane diametric outer surface for sliding of the latter thereover; said end wall and thrust bearing being cooperatively ported for flow of fluid therethrough to and from the control shaft passage.

2. The improvement defined in claim 1 including passage means in said flange and said bearing communicating with said spherical surfaces and said plane surfaces for introducing pressure fluid between the mating surfaces of said flange and said bearing and said bearing and said end wall.

3. The improvement defined in claim 2 in which said passage means communicates with the control shaft passages.

4. The improvement defined in claim 2 in which said last named means includes pressure fluid chambers on the axially inner surface of said flange in communication with the control shaft passages and arranged to balance the pressure forces on said thrust bearing.

5. The improvement defined in claim 2 in which said passage means includes bores through said flange.

6. The improvement defined in claim 1 including bolt means extending through said bearing and engaged in said end wall, and limiting rotational movement of said bearing.

7. The improvement defined in claim 1 including spring means biasing said flange to engage said thrust bearing.

8. The improvement defined in claim 1 including annular channels in the radially inner surface of said flange; passage means communicating with said control shaft passages and supplying fluid under pressure to said channels; and means fixed relative to said casing and closing said channels.

9. The improvement defined in claim 8 in which said last named means comprise rings slidable in said channels.

10. The improvement defined in claim 9 in which said fixed means comprises an annular element having an outer surface engaging said rings, and a substantially spherical inner surface; and a thrust ring having a substantially spherical surface engaging said last named inner surface and a plane surface engaging a fixed part of said casing.

11. The improvement defined in claim 1 in which the intermediate portions of the passages in the control shaft extend substantially axially thereof, and the passage ends extend at acute angles to the control shaft axis.

12. The improvement defined in claim 11 in which the control channel passages are streamline in longitudinal section.

13. The improvement defined in claim 11 in which the rotor inlet and outlet ports extend at acute angles to the rotor axis.

14. The improvement defined in claim 11 in which the trailing edges of the rotor inlet and outlet ports are streamline in a trailing direction.

15. The improvement defined in claim 13 in which the tangents of the last-named acute angles are of the order of the quotient of the radial component of the flow velocity and the rotor velocity.

16. The improvement defined in claim 1 in which the control shaft periphery within the rotor hub is formed with circumferentially extending, angularly spaced recesses decreasing in depth in the direction of rotor rotation; and port means connecting said recesses and the control shaft passages end supplying fluid under pressure to said recesses.

References Cited in the file of this patent

UNITED STATES PATENTS

| | | |
|---|---|---|
| 1,965,388 | Ott | July 3, 1934 |
| 2,148,282 | Stevens | Feb. 21, 1939 |
| 2,762,195 | Nubling | Sept. 11, 1956 |
| 2,785,637 | Nubling | Mar. 19, 1957 |

FOREIGN PATENTS

| | | |
|---|---|---|
| 183,020 | Switzerland | June 2, 1936 |
| 321,651 | Switzerland | June 29, 1957 |